INVENTOR
M. R. SCHROEDER
BY Jules P. Kirsch
ATTORNEY

May 23, 1967 M. R. SCHROEDER 3,321,582

WAVE ANALYZER

Filed Dec. 9, 1965 7 Sheets-Sheet 2

INPUT SIGNAL

GLOTTAL WAVEFORM SPECTRUM

VOCAL TRACT RESPONSE SPECTRUM

INPUT SIGNAL SPECTRUM 3,321,582

WAVE ANALYZER

Manfred R. Schroeder, Gillette, N.J., assignor to Bell Telephone Laboratories, Incorporated, New York, N.Y., a corporation of New York Filed Dec. 9, 1965, Ser. No. 517,170
11 Claims. (Cl. 179—1)

This application in part discloses and claims subject matter disclosed in an earlier filed pending application of the present applicant M. R. Schroeder, Ser. No. 300,264, filed Aug. 6, 1963 and now abandoned.

This invention relates to the analysis of complex waves, and in particular to the separation of carrier wave frequency components from modulating wave frequency components in the spectrum of an amplitude modulated wave. An important application of the principles of this invention is the determination of the formant structure and the fundamental period, or its reciprocal, the fundamental frequency, of human speech sounds.

One of the best known arrangements for the transmission of information is amplitude modulation, in which the amplitude of a first wave, called the carrier wave, is varied with respect to time in correspondence with time variations in the amplitude of a second wave, called the modulating wave, to produce an amplitude modulated wave. In mathematical terms, amplitude modulation may be described by the characteristics of the carrier and modulating waves as functions of time, or alternatively, by the characteristics of the amplitude spectrum of frequency components of each of the carrier and modulating waves. In the time domain, amplitude modulation is characterized by multiplication of the amplitude of a time varying carrier wave by the amplitude of a time varying modulating wave so that the amplitude of the modulated wave is the product of the amplitudes of the carrier and modulating waves. In the frequency domain, amplitude modulation is characterized by convolution of the spectra of the carrier and modulating waves so that the frequency components of the modulating wave are transposed from their original frequencies to so-called upper and lower sideband frequencies which are in close proximity to the frequencies of each of the carrier wave components.

Because of the transposition of frequency components which accompanies amplitude modulation, accurate detection of the frequency of a selected component of the spectrum of a modulated wave is a difficult task, conventionally requiring complex and expensive wave analyzing apparatus to separate the transposed modulating wave components from the carrier wave components. In the present invention, however, there is provided relatively simple, inexpensive apparatus that accurately measures the frequency of a selected component of an amplitude modulated wave by first restoring the transposed modulating wave components to their original frequencies.

The present invention restores the transposed modulating wave components of a non-negative amplitude modulated wave to their original frequencies by obtaining a logarithm wave that is proportional to the logarithm of the amplitude modulated wave. Since the logarithm of a product is equal to the sum of the logarithms of the individual factors in the product, by obtaining a logarithm wave this invention converts the product of the carrier and modulating waves represented by a modulated wave into a sum of the logarithms of the modulating and carrier waves. And it is this sum of logarithms which is represented by the logarithm wave of this invention. Further, since the amplitude spectrum of a sum of time varying waves is equal to the sum of the individual spectra of the waves, the spectrum of the logarithm wave obtained by this invention is equal to the sum of the individual spectra of the logarithms of the modulating and carrier waves. As explained in detail below, the components of the amplitude spectrum of the logarithm of any wave occur at the same frequencies as the components of the spectrum of the original wave, hence the components of the individual spectra of the logarithms of the carrier and modulating waves occur at the same frequencies as the components of the respective spectra of the original carrier and modulating waves, and therefore the sum of the spectra of the logarithms of the carrier and modulating waves is a spectrum with components that occur at the same frequencies as the components of the spectra of the original carrier and modulating waves. Thus by obtaining the logarithm of an amplitude modulated wave, the present invention restores the transposed components of the modulating wave to their original frequencies. Detection of the frequency of a selected component of the logarithm wave spectrum is then effected in this invention by providing a filter with an appropriate pass band to suppress unwanted components in the spectrum of the logarithm wave, followed by frequency measuring equipment to drive a signal indicative of the frequency of a selected component.

An important feature of the present invention is its application to the accurate detection of the presence of voiced and unvoiced portions of a speech wave, and when voiced sounds are present, to the accurate detection of the fundamental period, or its reciprocal, the fundamental frequency, of a speech wave. Accurate detection of these speech characteristics is important to the intelligibility and naturalness of speech transmitted by bandwidth compression systems, an example of which is the vocoder described in H. W. Dudley Patent 2,151,091, issued Mar. 21, 1939.

It is well known that human speech is produced by the response of the vocal tract to a sound excitation source, with so-called voiced speech sounds being produced by the response of the vocal tract to periodic puffs of air which are released from the lungs into the vocal tract by the glottis, and with so-called unvoiced speech sounds being produced by the response of the vocal tract to a turbulent noise source. The portions of a speech wave corresponding to voiced sounds are characterized by a periodic waveform, the length of each waveform period being determined by the period of the glottal puffs that excite the vocal tract; correspondingly, the portions of a speech wave corresponding to unvoiced sounds are characterized by an aperiodic waveform reflecting the aperiodic nature of the turbulent noise exciting the vocal tract.

Human speech may also be defined in terms of the spectrum of the vocal tract response and the spectrum of the excitation source, so that the spectrum of a speech wave is the product of the spectrum of the vocal tract and the spectrum of the excitation source, as described by G. Fant, Acoustic Theory of Speech Production, pages 16, 19 (1960). In the case of voiced speech sounds, the contribution of the spectrum of the periodic excitation source to the product speech spectrum manifests itself as a discrete fine structure in the speech spectrum; that is, the speech spectrum contains a number of individual frequency components of various amplitudes which occur at harmonically related frequencies, the first harmonic or fundamental frequency being the reciprocal of the excitation source period. However, in the case of unvoiced speech sounds, the contribution of the spectrum of the aperiodic excitation source to the product speech spectrum manifests itself as a continuous fine structure; that is, the spectrum of an unvoiced speech sound contains no discrete, individual frequency components. The contribution of the vocal tract spectrum to the product speech spectrum manifests itself as the envelope or outline of the fine structure, with the envelope having several sharp, relatively well-defined peaks or formants in the case of voiced sounds and several relatively broad peaks in the case of unvoiced sounds.

As a product of two spectra, the spectrum of a speech wave closely resembles an amplitude modulated wave in which the excitation source spectrum corresponds to a carrier wave and the vocal tract response spectrum corresponds to a modulating wave. Despite this resemblance, however, the spectrum of a speech wave at a given instant is a function of frequency, not of time, so that in order to detect the above-mentioned speech characteristics in accordance with the principles of this invention, it is first necessary to convert the speech spectrum into an amplitude modulated time waveform in which the "carrier wave" portion of the time waveform corresponds to the excitation source spectrum and the "modulating wave" portion of the time waveform corresponds to the vocal tract response spectrum.

The conversion of a speech amplitude spectrum into a time waveform creates for the time waveform an amplitude spectrum that is the convolution of the "carrier wave" spectrum and the "modulating wave" spectrum. Since the "carrier wave" itself corresponds to the excitation source spectrum, the spectrum of the "carrier wave" is a "spectrum of a spectrum" which is characterized by spectral components that occur at harmonics of the fundamental frequency of the "carrier wave." In the case of voiced speech sounds, the fundamental "frequency" of the "carrier wave" is equal to the fundamental period of the original speech wave, so that the fundamental frequency of the "carrier wave" spectral components represents the fundamental period of the speech wave. Correspondingly, "modulating wave" portion of the time waveform is itself a spectrum, so that the spectrum of the "carrier wave" is a "spectrum of a spectrum" which is characterized by spectral components that occur at harmonics of the fundamental "frequency" of the "modulating wave." However, the "modulating wave" represents the envelope of the original speech spectrum, hence the spectral components of the "modulating wave" occur at frequencies determined by the wave shape of the envelope. Specifically, in the case of voiced sounds the envelope resembles a relatively low frequency or long period wave so that the spectral components of the "modulating wave" portion of the time waveform occur at relatively low frequencies. However, because the spectrum of the time waveform is the convolution of the "carrier wave" and "modulating wave" components, the "modulating wave" components are transposed from their original low frequencies to upper and lower sideband frequencies which are in close proximity to the carrier wave components.

By obtaining a logarithm wave which is proportional to the logarithm of the time waveform, the present invention separates the "modulating wave" components from the "carrier wave" components. Appropriate filtering of the logarithm wave to suppress one set of components and pass the other set permits two important characteristics of voiced speech sounds to be determined with a high degree of accuracy, the fundamental period on one hand and the envelope or formant structure on the other.

The presence of voiced or unvoiced sounds in the original speech wave may also be determined from the amplitude level of the filtered logarithm wave, since voiced speech sounds are characterized by a periodic filtered logarithmic wave of relatively large amplitude, while unvoiced speech sounds have no fundamental frequency component and are characterized by a filtered logarithmic wave which is aperiodic and has a relatively small amplitude. Hence in the present invention, the presence of voiced or unvoiced portions of the original speech wave is determined by comparing the amplitude level of the filtered logarithmic wave against a preset threshold corresponding to the smallest amplitude level associated with voiced sounds. When the measured amplitude level of the filtered logarithmic wave falls below this threshold, it indicates that an unvoiced portion of the speech wave is present, whereas when the measured amplitude level exceeds the threshold it indicates that a voiced portion of the speech wave is present.

The invention will be fully understood from the following detailed description of illustrative embodiments thereof taken in connection with the appended drawings, in which:

FIG. 1 is a schematic block diagram of apparatus embodying the principles of this invention;

FIGS. 2A, 2B, 2C, 2D, 2E, 2F, and 2G are graphs of assistance in explaining certain features of this invention;

FIGS. 3A, 3B, 3C, 3D, 3E, 3F, and 3G are additional graphs of assistance in explaining certain features of this invention;

*Theoretical considerations*

Figure 2A:
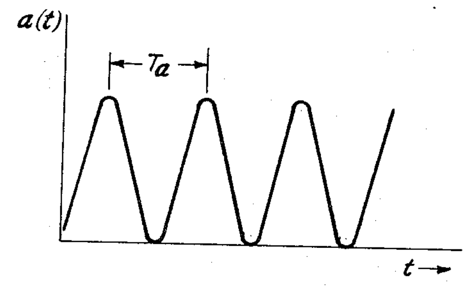

A periodic function or wave, $a(t)$, is defined by $$a(t)=\sum_{n=-\infty}^{\infty} a(t+nT_a)$$

where $T_a$ denotes the duration of each period of $a(t)$. It is well known that periodic functions are characterized by a so-called amplitude spectrum of harmonic frequency components that occur at integral multiples of the fundamental frequency, $1/T_a$. Thus the periodic sinusoidal function $a(t)$ shown in FIG. 2A has an amplitude spectrum $A(f)$ with the structure shown in FIG. 2B, in which the heights of the equally spaced vertical lines represent the amplitudes of the frequency components of $a(t)$, and the lines are uniformly spaced at integral multiples of $1/T_a$ cycles per second.

Figure 2B:
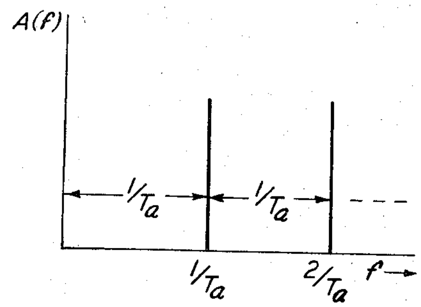
Figure 2C:
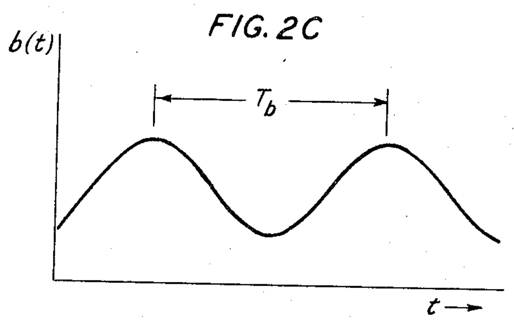
Figure 2D:
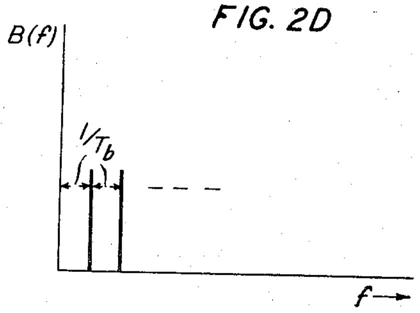

Amplitude modulation of $a(t)$ by another periodic, sinusoidal function or wave $b(t)$, with period $T_b$ and spectrum $B(f)$, as shown in FIGS. 2C and 2D, respectively, produces a modulated function, $p(t)$, where $p(t)$ is defined by the product of $a(t)$ and $b(t)$, $$p(t)=a(t)\cdot b(t) \quad (1)$$

Figure 2E:
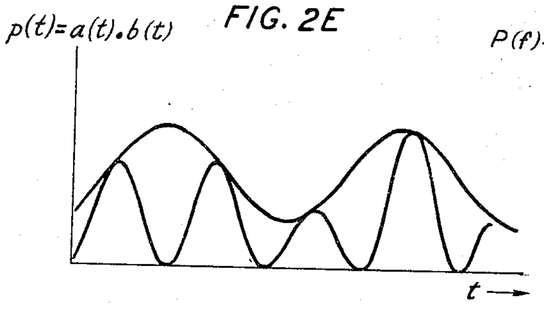
Figure 2F:
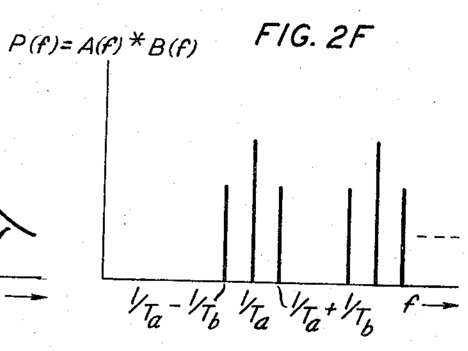

The modulated function $p(t)$ has a waveform of the type shown in FIG. 2E. Multiplication of the periodic time functions $a(t)$ and $b(t)$ to produce $p(t)$ is accompanied by convolution of the corresponding spectra $A(f)$ and $B(f)$ to produce the spectrum $P(f)$ of $p(t)$; that is, $$P(f)=A(f)*B(f) \quad (2)$$

where the symbol "*" denotes the convolution operation. Part of the spectrum $P(f)$ is illustrated in FIG. 2F, in which it is observed that the frequency components of $P(f)$ occur in groups, each of which comprises a center component surrounded by upper and lower sideband components. As shown in the group of components closest to the origin in FIG. 2F, the center frequency component, $1/T_a$ represents the contribution of components to $P(f)$ from $A(f)$, while the upper and lower sideband components, $(1/T_a+1/T_b)$ and $(1/T_a-1/T_b)$, represent the contribution of components to $P(f)$ from $B(f)$.

As illustrated in FIG. 2F, modulation of a carrier wave $a(t)$ by a modulating wave $b(t)$ transposes the frequency components of the spectrum $B(f)$ to the vicinity of each component of the spectrum $A(f)$ to form the center component-sideband component structure of the spectrum $P(f)$. It is evident from the structure of the spectrum $P(f)$ that accurate measurement of the frequency of a selected component of $P(f)$ is hampered by the close proximity of the sideband components to each of the center components, since accurate measurement first requires that components other than the selected component be removed in order to ensure that the frequency being measured is in fact that of the selected component.

The present invention provides a solution to the problem of accurately measuring the frequency of a selected component of an amplitude modulated wave by restoring the transposed components in the spectrum of the modulated wave to their original frequencies. Since the components of a carrier wave and a modulating wave ordinarily differ substantially in frequency, restoration of the transposed components effectively separates the two groups of components. This restoration of transposed components to their original frequencies is accomplished by obtaining the logarithm of the amplitude modulated wave so that $$\begin{aligned}\log p(t) &= \log [a(t)\cdot(t)] \\ &= \log a(t) + \log b(t) \qquad (3)\end{aligned}$$

where it is assumed that prior to obtaining the logarithm, $\log p(t)$, the wave $p(t)$ is adjusted as necessary to be non-negative. The spectrum of $\log p(t)$, unlike the spectrum of $p(t)$, is given by the sum of the individual spectra of $\log a(t)$ and $\log b(t)$, since the spectrum of a sum of functions is known to be equal to the sum of the individual spectra of the functions in the sum; for example, see A. A. Kharkevich, Spectra and Analysis, page 12 (1960). Thus if the spectra of $\log p(t)$, $\log a(t)$, and $\log b(t)$ are respectively denoted $P_L(f)$, $A_L(f)$, and $B_L(f)$, then $$P_L(f) = A_L(f) + B_L(f) \qquad (4)$$

Figure 2G:
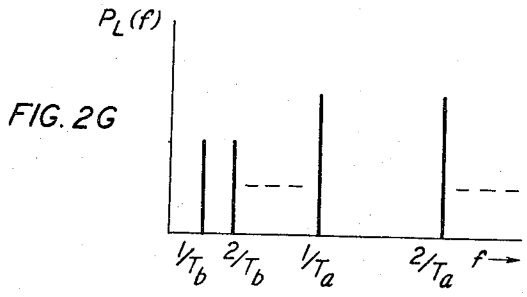

From Equation 4, it is evident that the additive combination of the frequency components of $A_L(f)$ and $B_L(f)$ to form $P_L(f)$ does not change the relative positions of the two groups of components on the frequency scale. As demonstrated below, the components of $A_L(f)$ and $B_L(f)$ correspond in frequency to the components of $A(f)$ and $B(f)$, respectively, therefore obtaining the logarithm of $p(t)$ restores the transposed frequency components in the spectrum $P(f)$ to their original positions on the frequency scale in the spectrum $P_L(f)$ of $\log p(t)$, as shown in FIG. 2G.

The following example will demonstrate that the components of the spectrum of both a periodic function $g(t)$ and its logarithm, $\log g(t)$, occur at integral multiples of the fundamental frequency $1/T_g$, where $T_g$ is the duration of the period of $g(t)$. Considering two periods of $g(t)$, if the amplitude spectrum of the first period is denoted $G(f)$, then the amplitude spectrum of the second period is $e^{j2\pi fT_g}\cdot G(f)$, so that the spectrum of both periods is equal to the sum $$G(f) + e^{j2\pi fT_g}\cdot G(f) = G(f)[1 + e^{j2\pi fT_g}] \qquad (5)$$

where $T_g$ is the duration of the period of $g(t)$. Taking the logarithm of two periods of $g(t)$ in the time domain is the same as taking the logarithm of the absolute value of the spectrum of the two periods, as given by the right-hand side of Equation 5, which produces $$\begin{aligned}&\log|G(f)|\cdot|1+e^{j2\pi fT_g}| \\ &= \log|G(f)| + \log|1+e^{j2\pi fT_g}| \\ &= \log|G(f)| + \log|(1+\cos 2\pi fT_g) + j \sin 2\pi fT_g| \qquad (6)\end{aligned}$$

Since it is well known that $$|a+jb|^2 = (a+jb)\cdot(a-jb) = (a^2+b^2)$$

Equation 6 may be rewritten $$\begin{aligned}&\log|G(f)|\cdot|1+e^{j2\pi fT_g}| \\ &= \log|G(f)| + \tfrac{1}{2} \log [(1+\cos 2\pi fT_g)^2 + (\sin 2\pi fT_g{}^2)] \\ &= \log|G(f)| + \tfrac{1}{2} \log (1+\cos 2\pi fT_g) + \tfrac{1}{2} \log 2 \qquad (7)\end{aligned}$$

From the second term on the right-hand side of Equation 7 it is evident that the spectrum of two periods of $\log g(t)$ has spectral peaks every $1/T_g$ cycles per second, hence as more periods of $g(t)$ are used the spectral peaks of $\log G(f)$ tend to become lines representing frequency components spaced at integral multiples of $1/T_g$. Since $1/T_g$ is the fundamental frequency spectrum $G(f)$ of $g(t)$, the components of $\log G(f)$ occur at the same frequencies as the corresponding components of $G(f)$. It is apparent from the foregoing argument that the logarithmic spectra, $A_L(f)$ and $B_L(f)$, which define the spectrum $P_L(f)$ in Equation 4, have components that occur at the same frequencies as the corresponding components of the original spectra, $A(f)$ and $B(f)$, respectively. From this it follows that the components of the logarthmic spectrum $P_L(f)$ defined by the sum of $A_L(f)$ and $B_L(f)$ in Equation 4 occur at the same frequencies in $P_L(f)$ as in the original spectra, $A(f)$ and $B(f)$, thereby demonstrating that obtaining the logarithm of a modulated wave $p(t)$ restores the transposed components in the spectrum $P(f)$ to their original frequencies in the logarithmic spectrum $P_L(f)$. A comparison of FIGS. 2B, 2D, and 2G shows graphically the relationship of the components of the individual spectra, $A(f)$ and $B(f)$, to the logarithm spectrum, $P_L(f)$.

*Apparatus*

In FIGS. 1, 4, 5, and 7, signal paths between various circuit elements are shown by single lines in order to avoid unnecessary complexity. It will be obvious to those skilled in the art at what points one or more wire pairs or other complete circuits may be required to practice this invention.

Figure 1:
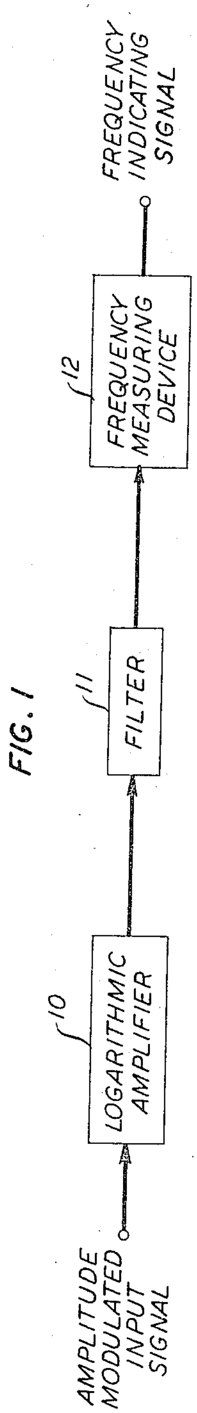

Based upon the principles described above, the frequency of a selected component of a modulated wave $p(t)$ may be found with accuracy by apparatus of the type shown in FIG. 1. An incoming modulated wave produced by modulation of a carrier wave with a modulating wave is applied as an input signal to a logarithmic amplifier 10 of any well-known construction to obtain at the output terminal of amplifier 10 a logarithmic wave representing the logarithm of the incoming wave. The logarithmic wave, as explained above, has an amplitude spectrum in which the components occur at the same frequencies as the components of the spectra of the individual carrier and modulating waves that produced the modulated wave. Hence by passing the logarithmic wave through a filter 11 having an appropriate pass band, unwanted components may be eliminated, and the frequencies of desired components may then be measured by a suitable frequency measuring device 12, which produces one or more frequency indicating output signals.

For example, to measure the fundamental frequency of the harmonically related components of a typical carrier wave spectrum, the pass band of filter is designed to pass only that band of frequencies which includes the carrier wave components. The components passed by filter 11 in this instance therefore define a time wave with a period equal to the reciprocal of the fundamental carrier frequency, hence measuring device 12 may be a well-known zero-crossing or axis-crossing apparatus which obtains from the time wave output of filter 11 a signal whose magnitude is representative of fundamental carrier frequency.

A specific application of the principles described above is the accurate measurement of the fundamental period of the voiced sounds of human speech. It is well known that the voiced sounds of human speech are produced by exciting the vocal tract with quasi-periodic puffs of air released by the glottis from the lungs. In spectral terms, the spectrum $S(f)$ of a periodic, voiced portion of a speech wave $s(t)$ is the product of the spectrum $U(f)$ due to the periodicity of the glottal waveform $u(t)$ and the spectrum $V(f)$ due to the vocal tract response $v(t)$ and the shape of one glottal puff; that is, $$S(f) = U(f)\cdot V(f) \qquad (8)$$

for example, see G. Fant, Acoustic Theory of Speech Production, page 19 (1960).

Figure 3A:
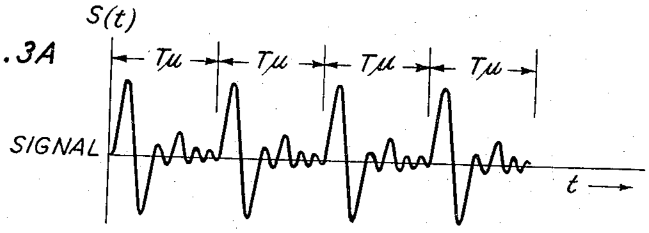
Figure 3B:
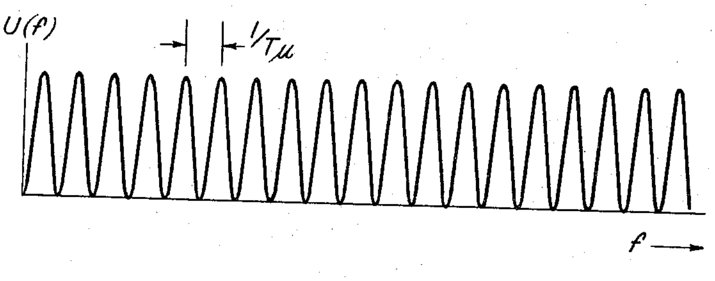
Figure 3C:
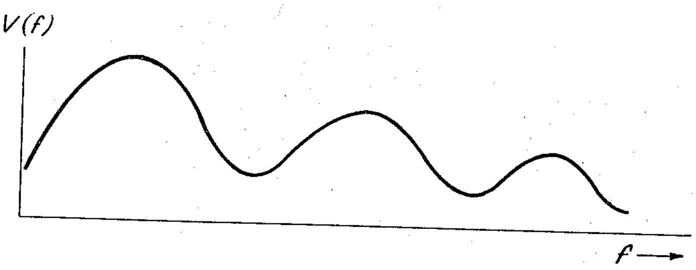
Figure 3D:
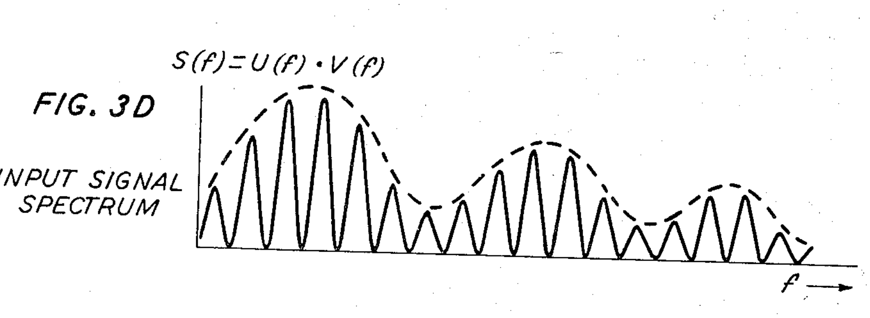

A typical voiced portion of a speech wave $s(t)$ with period $T_u$ is shown in FIG. 3A, and FIGS. 3B and 3C show the respective glottal waveform and vocal tract response spectra. FIG. 3D illustrates the respective contributions of the glottal waveform spectrum $U(f)$ and the vocal tract response spectrum $V(f)$ to the speech spectrum $S(f)$. It is observed in FIG. 3B that the components of the glottal waveform spectrum are spaced at integral multiples of $1/T_u$ cycles per second, the reciprocal of the fundamental period $T_u$ of the speech wave $s(t)$.

It is further observed in FIG. 3D that the spectrum $S(f)$ resembles an amplitude modulated wave of the type shown in FIG. 2E, in which the so-called fine structure of $S(f)$ attributable to the glottal waveform spectrum $U(f)$ corresponds to the carrier wave $a(t)$, and the envelope of $S(f)$ attributable to the vocal tract response spectrum $V(f)$ corresponds to the modulating wave $b(t)$. By changing the independent variable in FIG. 3B from frequency to time, the present invention converts the speech spectrum $S(f)$ to a time waveform $S(t)$ as shown in FIG. 3E, in which the "carrier wave" $c(t)$ corresponds to the fine structure of $S(f)$ contributed by the glottal waveform spectrum $U(f)$, and the "modulating wave" $d(t)$ corresponds to the envelope of $S(f)$ contributed by the vocal tract response spectrum $V(f)$.

Figure 3E:
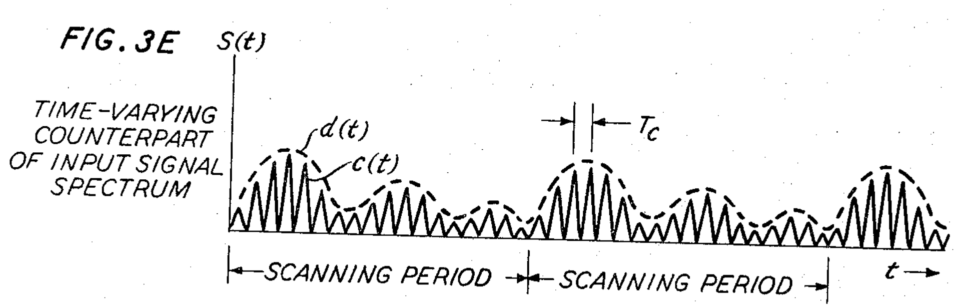

It is evident from FIGS. 3A, 3B, and 3E that the "period" of the carrier wave $c(t)$ in FIG. 3E, denoted $T_c$, is directly proportional to the fundamental frequency $1/T_u$ of the components in FIG. 3B and inversely proportional to the fundamental period $T_u$ of the speech wave $s(t)$ in FIG. 3A, while the modulating wave "period" is determined by the wave shape of the vocal tract response spectrum. Hence measurement of the fundamental frequency, $1/T_c$, of $c(t)$ also provides a measure of the period of $s(t)$. The exact relationship between $T_c$ and $T_u$ is described in detail below.

Figure 3F:
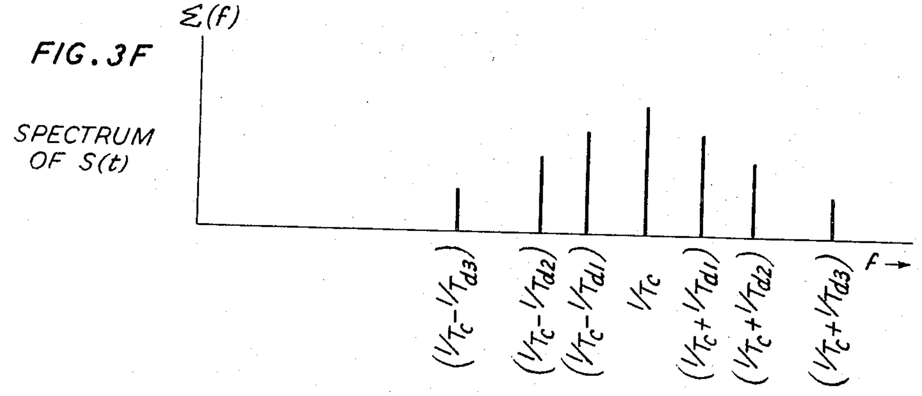
Figure 3G:
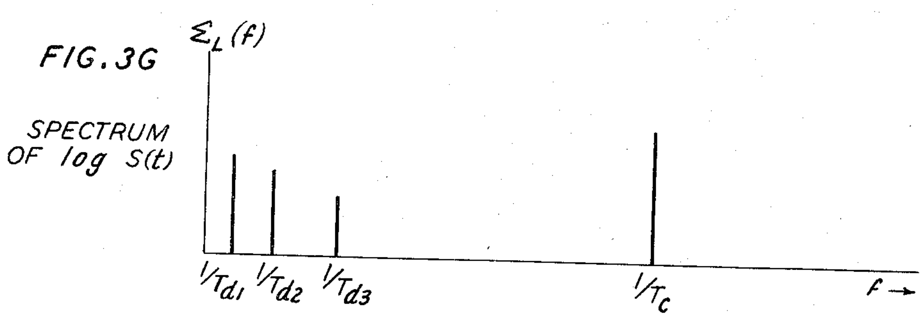

Part of the spectrum $\Sigma(f)$ of $S(t)$ is illustrated in FIG. 3F, in which it is noted that the components of $\Sigma(f)$ are arranged in the center component-sideband component relationship previously discussed in the description of FIG. 2F. The center component shown in FIG. 3F is located at the fundamental frequency $1/T_c$ of the carrier wave $c(t)$, while the sideband components are located at the sum and difference frequencies formed from the fundamental component $1/T_c$ of the spectrum of the carrier wave $c(t)$ and the various components $1/T_{d1}$, $1/T_{d2}$ . . . of the spectrum of the modulating wave $d(t)$. FIG. 3F also illustrates graphically the difficulty in accurately measuring $1/T_c$ because of the proximity of the sideband components, and FIG. 3G illustrates graphically that obtaining the logarithm of $S(t)$ separates the carrier and modulating and wave components of $\Sigma(f)$. This separation of carrier and modulating wave frequency components facilitates accurate measurement of either or both sets of components. In the case of a speech spectrum that has been converted into a function of time, obtaining the logarithm of the time function facilitates both the accurate determination of the fundamental speech period through measurement of the fundamental carrier component frequency $1/T_c$, and the accurate determination of the envelope characteristics of the speech wave spectrum from the components $1/T_{d1}$, $1/T_{d2}$ . . .

The exact relationship between the fundamental period $T_c$ of the carrier wave $c(t)$ and the fundamental period $T_u$ of the original speech wave $s(t)$ depends upon the relationship between the length of the time scale $\Delta t$ of $S(t)$ and the length of the frequency scale $\Delta f$ of $S(f)$. Thus if the two scales are related by the equation $$\Delta f = k\Delta t \qquad (9)$$

where $k$ is a constant of proportionality expressed in cycles per second per second, then $T_c$, the period or spacing between peaks of $c(t)$, is related to $1/T_u$, the spacing between peaks of $U(f)$, by the equation $$1/T_u = k \cdot T_c \qquad (10)$$

From Equation 10 it is evident that a measurement of the fundamental frequency, $1/T_c$, of the components of $c(t)$ in the spectrum of $S(t)$ will be directly proportional to the fundamental speech period $T_u$, whereas a measurement of the fundamental carrier period, $T_c$, will be directly proportional to the fundamental speech frequency, $1/T_u$.

Figure 4:
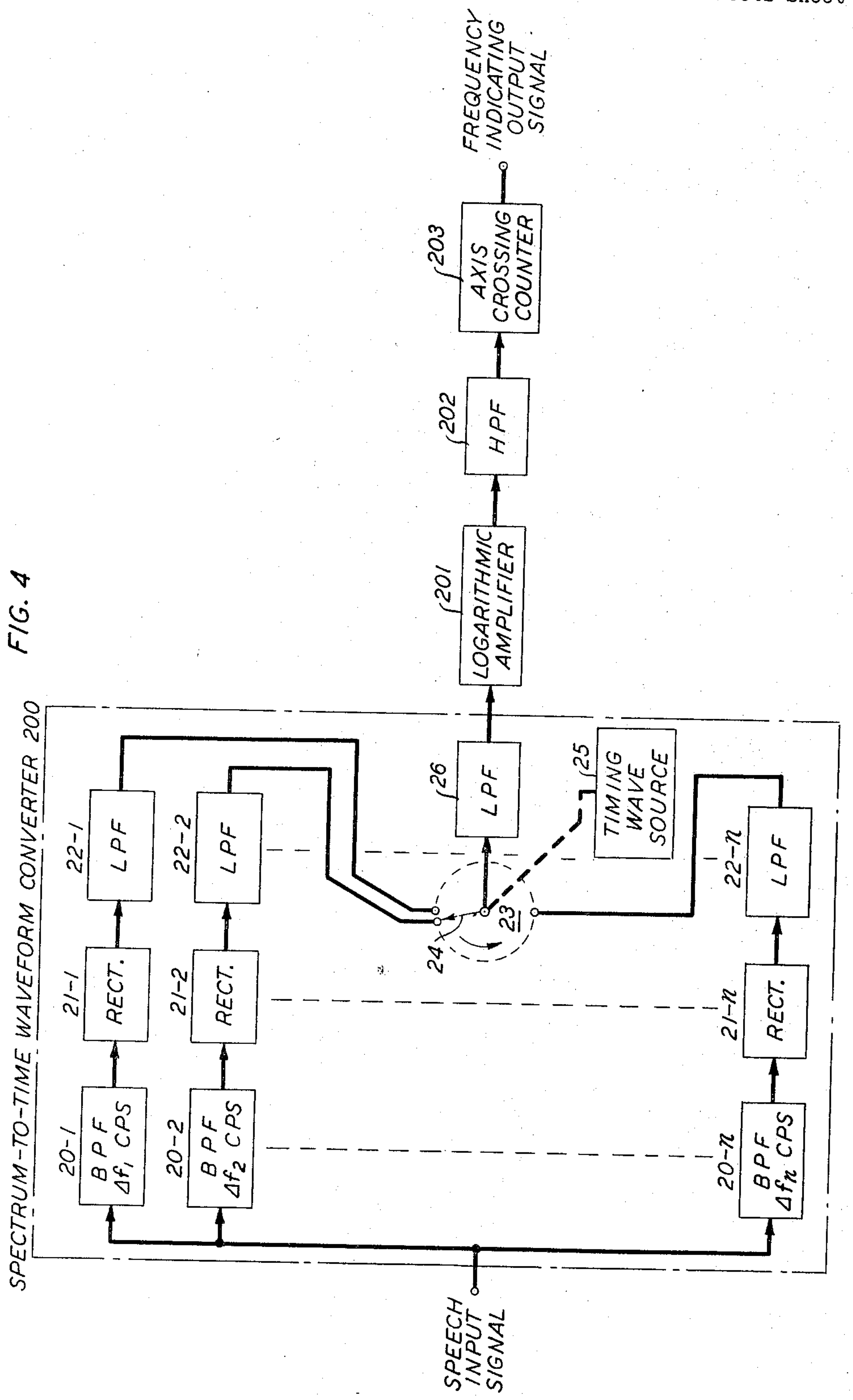
FIG. 4 is a schematic block diagram illustrating equipment for detecting the fundamental period of a speech wave in accordance with the principles of this invention.

Turning now to FIG. 4, this drawing illustrates apparatus embodying the principles of this invention for measuring the fundamental period of voiced portions of a human speech wave. An incoming speech signal is applied to a spectrum-to-waveform converter 200 that converts the amplitude spectrum of the speech wave into a time waveform, as illustrated in FIGS. 3D and 3E by the change of variable from frequency to time. Within converter 200 the speech signal is delivered to the input points of a bank of parallel connected bandpass filters 20–1 through **20–*n*. The respective pass bands $\Delta f_1$ through $\Delta f_n$ of these filters are contiguous and together span the frequency range of the speech signal at intervals specified by the sampling theorem. Thus the sampling theorem states that if the longest anticipated period of voiced portions of the speech wave is $T_u$ seconds, then the speech spectrum is completely specified by samples taken at intervals of $1/2T_u$ cycles per second. By way of example, a speech wave with a frequency range of 4,000 cycles per second and a longest anticipated period of 10 milliseconds will require $n=80$ filters 20–1 through 20–*n*** spaced at intervals of $$\frac{1}{2\times10^{-2}}=50$$

cycles per second to sample completely the speech spectrum.

The output terminals of filters 20–1 through **20–*n* are connected to a corresponding bank of rectifiers 21–1 through 21–*n*, followed by a bank of low pass filters 22–1 through 22–*n***. The rectifiers and low pass filters may be of conventional construction, and the cut-off frequency of each of the low pass filters may be on the order of 30 cycles per second.

In this fashion the signals appearing at the output terminals of filters 22–1 through **22–*n* at a given instant represent the individual frequency components of the spectrum of the speech wave at that instant, as shown in FIG. 3D. The spectrum component signals are sequentially sampled by a commutator 23 with a scanning element, here shown as a mechanical wiper arm 24, which rotates in a counterclockwise direction at a rate controlled by timing wave source 25. In order to sample with accuracy the output signal of a single filter 22–1 through 22–*n*, the scanning rate of element 24 is specified by the sampling theorem to be no less than twice the cut-off frequency of the filter, so that for a cut-off frequency of $W_0$ cycles per second the scanning rate of element 24 must be no less than $2W_0$ revolutions per second. Since there are $n$ filters, this scanning rate produces a time sequence of $2W_0 \cdot n$ samples per second at the output terminal of scanner 24. For example, for a cut-off frequency of $W_0=30$ cycles per second, the scanning rate of element 24 must be no less than 60 revolutions per second, and for $n=80$ filters 22–1 through 22–*n*, this scanning rate produces 4,800 samples per second at the output terminal of scanner 24**.

The time sequences of pulses appearing at the output terminal of scanner 24 are converted by low pass filter 26 into a time waveform of the type shown in FIG. 3E, that is, the time waveform obtained by commutator 23 and filter 26 from the spectrum output signals of filters 22–1 through **22–*n* resembles an amplitude modulated carrier wave in which the periods of the carrier wave correspond to the peaks of the glottal wave spectrum, while the modulating wave periods correspond to peaks in the vocal tract response spectrum. The cut-off frequency of filter 26 is specified by the sampling theorem according to the number of samples per second which are obtained at the output terminal of scanner 24. Thus if the number of samples per second is equal to $2W_0 \cdot n$, then the cut-off frequency of filter 26 must be $W_0 \cdot n$. From the previous example in which $2W_0 \cdot n = 4{,}800$ samples per second, the corresponding cut-off frequency of filter 26** must be 2,400 cycles per second.

It is recalled that Equation 9 specifies the relationship between the time scale of the quasi-periodic time waveform and the frequency scale of the speech spectrum, with the length of the time scale being determined by the scanning rate of scanning element 24 of commutator 23. For example, if the scanning rate is equal to 60 revolutions per second, then the length of a single scanning revolution or period is 1/60 of a second. Further, if the frequency range of the speech spectrum is 4,000 cycles per second, then the constant $k$ in terms of cycles per second per second is equal to $$k = \frac{4{,}000}{\frac{1}{60}} = 240{,}000 \text{ c.p.s./second} \quad (11)$$

From filter 26 the time waveform is passed to a logarithmic amplifier 201, which may be of any conventional design, to obtain at the output terminal of amplifier 201 a logarithmic signal proportional to the logarithm of the time waveform. As previously explained and illustrated in FIGS. 3F and 3G, obtaining the logarithm of the time waveform is accompanied by a separation of the carrier and modulating components in the spectrum $\Sigma_L(f)$ of the logarithm of the time waveform. Specifically, obtaining the logarithm of the time waveform separates the carrier and modulating components by restoring the modulating components to their original frequencies. After obtaining the logarithmic signal, the modulating components of $\Sigma_L(f)$, which are due to the contribution of the vocal tract response spectrum to the speech spectrum, may be eliminated from $\Sigma_L(f)$ by an appropriately constructed high pass filter 202 in order to facilitate measurement of either the fundamental carrier frequency or the fundamental carrier period by a suitable measuring device, shown here as a conventional axis-crossing counter 203 for measuring the fundamental carrier period.

The construction of high pass filter 202 depends upon the following considerations. Assuming that the frequency range of the incoming speech signal has a width of 4,000 cycles per second and that the scanning period of commutator 23 is 1/60 second, Equation 11 specifies that $k$ is equal to 240,000. Then if the fundamental component $1/T_u$ of the incoming speech spectrum varies over a frequency range extending from 100 to 300 cycles per second, Equation 10 specifies that the component $1/T_c$ of the logarithm spectrum correspondingly varies over a frequency range extending from 2,400 to 800 cycles per second. Similarly, if the vocal tract components of the incoming speech spectrum vary over a frequency range extending from 500 to 1,000 cycles per second, then the components $1/T_{d1}$, $1/T_{d2}$ . . . of the logarithm spectrum correspondingly vary over a frequency range extending from 480 to 240 cycles per second. It is therefore evident that under these conditions a high pass filter with a cut-off frequency on the order of 500 to 700 cycles per second will eliminate the low frequency components of the logarithm spectrum which corresponds to the high frequency components of the vocal tract spectrum, and pass the high frequency components of the logarithm spectrum which correspond to the low frequency components of the glottal spectrum.

Referring back to Equation 7, the first term on the right-hand side, $\log|G(f)|$, represents the logarithm of the envelope of the spectrum, $G(f)$, and in the case of a speech spectrum, this envelope term corresponds to the contribution of the vocal tract response spectrum $V(f)$ to the speech spectrum $S(f)$. For voiced speech sounds, the logarithm of the spectrum envelope has negligible frequency components $1/T_{d1}$, $1/T_{d2}$ . . . near and above the fundamental frequency $1/T_c$ of the glottal waveform spectrum. Thus by low-pass filtering the logarithm of a speech spectrum with a filter whose cut-off frequency is below but close to the smallest expected value of $1/T_c$, an excellent approximation to the true spectrum envelope is obtained. Thus, for a logarithm spectrum with a component $1/T_c$ whose smallest anticipated value is 800 cycles per second, as in the preceding example, a cut-off frequency on the order of 700 cycles per second is suitable.

Figure 7:
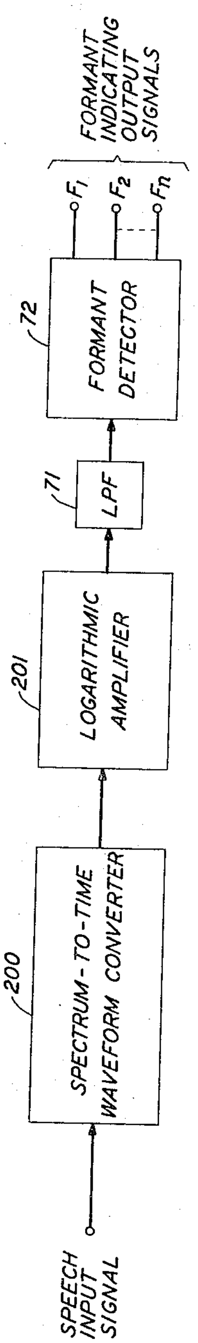
FIG. 7 is a schematic block diagram illustrating equipment for detecting the formants of a speech spectrum in accordance with the principles of this invention.

Apparatus for obtaining an approximation to the true spectrum envelope in accordance with the above considerations is shown in FIG. 7. An incoming speech signal is applied to spectrum-to-time waveform converter 200, which may be identical with the similarly numbered component in FIG. 4, in order to convert the spectrum of the input speech signal into a time waveform. The time waveform developed by converter 200 is passed to logarithmic amplifier 201, which may be of the same construction as amplifier 201 in FIG. 4, to obtain a logarithmic output signal proportional to the logarithm of the time waveform and therefore representative of the logarithm of the speech spectrum. By passing the logarithmic signal through an appropriately designed low pass filter 71, the carrier components of the spectrum $\Sigma_L(f)$ of the logarithm of the time waveform are eliminated, so that in the case of speech the modulating components passed by filter 71 define a signal indicative of the envelope of the original speech spectrum. Detection of the peaks or formants in the envelope signal appearing at the output terminal of filter 71 may be accomplished by any one of a number of well-known arrangements; for example, formants in the envelope signal may be located by determining the frequencies at which maxima occur in the waveform of the envelope signal, in accordance with the principles shown in FIG. 14 and described on page 239 of an article by E. E. David, Jr., entitled "Signal Theory in Speech Transmission," vol. CT–3, I.R.E. Transactions on Circuit Theory (December 1956). The output signals of detector 72 typically represent the frequencies of the principal peaks or formats in the spectrum envelope, denoted $F_1, F_2 \ldots F_n$ as shown in the drawings.

Figure 5:
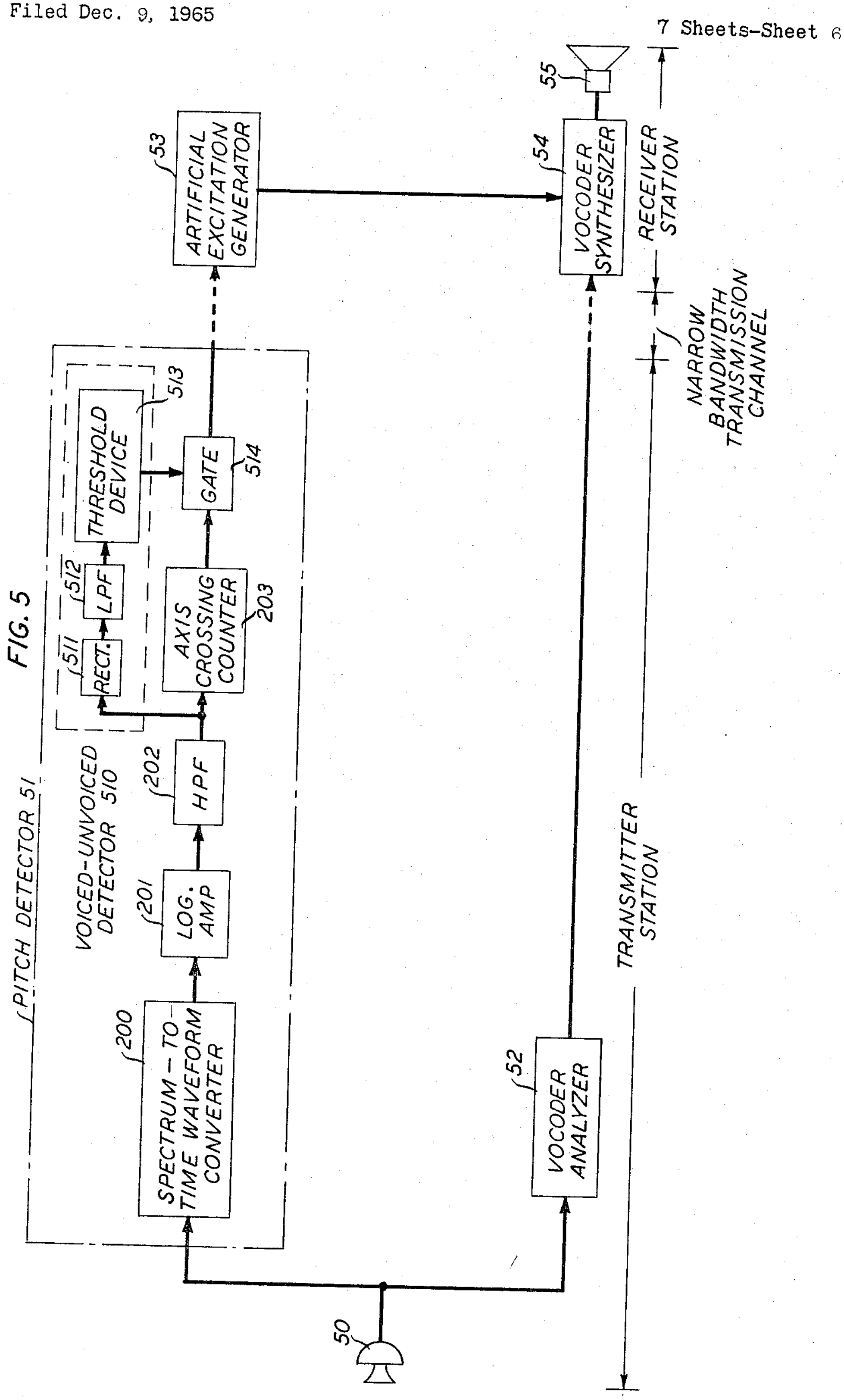
FIG. 5 is a schematic block diagram of a complete bandwith compression system embodying the principles of this invention.

FIG. 5 illustrates a complete vocoder communication system embodying the principles of this invention. At the transmitter station of the system an incoming speech signal from source 50, for example, a conventional microphone, is applied simultaneously to pitch detector 51 and to vocoder analyzer 52. Analyzer 52 may be any one of a number of well-known arrangements for deriving from a speech wave a group of narrow bandwidth control signals representative of selected information-bearing characteristics of the speech wave; for example, analyzer 52 may be either a channel vocoder analyzer or a resonance vocoder analyzer having the structure shown in an article by E. E. David, Jr., entitled, "Signal Theory in Speech Transmission," I.R.E. Transactions on Circuit Theory, volume CT–3, page 232 (1956).

Pitch detector 51 derives from the speech wave from source 50 a so-called pitch control signal that indicates whether a voiced or an unvoiced speech sound is present at a given instant, and if the sound is voiced, the pitch control signal indicates the fundamental frequency of the speech wave at that instant. Within detector 11, the incoming speech wave is applied to spectrum-to-waveform converter 200, which is followed by logarithmic amplifier 201, high pass filter 202, and axis-crossing counter 203, all connected in tandem in the same manner as correspondingly labeled elements of the apparatus shown in FIG. 4.

Figure 6A:
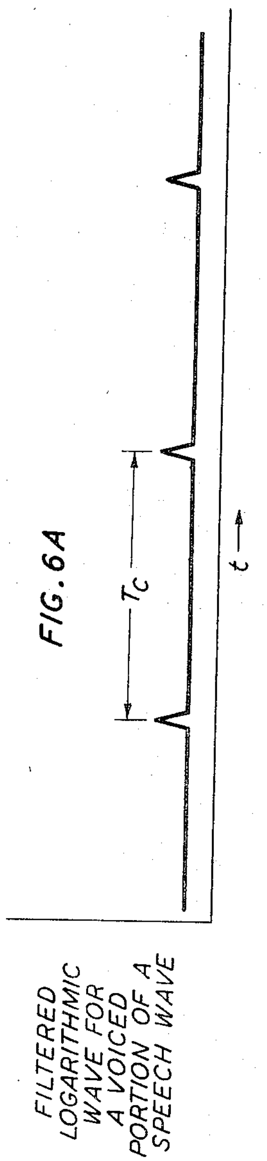
FIGS. 6A and 6B are additional graphs of assistance in explaining certain features of this invention.
Figure 6B:
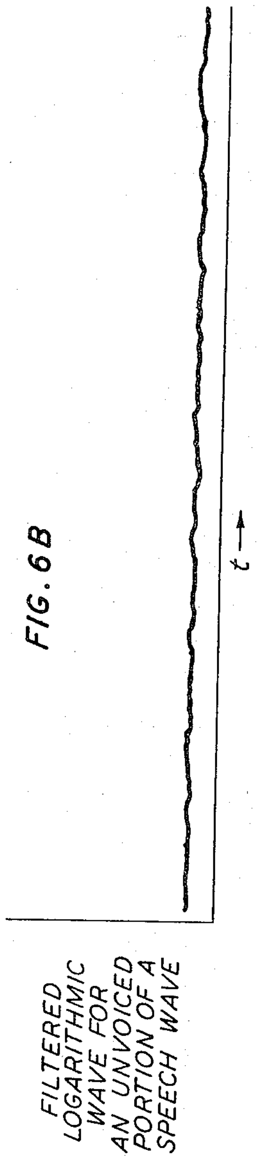

From the relationship expressed by Equation 10 between the fundamental speech period, $T_u$, and the fundamental frequency, $1/T_c$, of the components in the spectrum of the filtered logarithmic wave developed at the output terminal of filter 202, it is evident that the characteristics of the filtered logarithmic wave are not the same for both voiced and unvoiced portions of the speech wave. Specifically, as shown in FIG. 6A, the filtered logarithmic wave corresponding to a voiced portion of the original speech wave has relatively large, periodic peaks that occur at periodic intervals, $T_c$. However, the logarithmic wave corresponding to an unvoiced portion of the original speech wave does not have periodic peaks, and as shown in FIG. 6B, is characterized by relatively small variations in amplitude.

Accordingly, the relative amplitude of the filtered logarithmic wave is utilized in the present invention to distinguish between voiced and unvoiced portions of the original speech wave.

Voiced and unvoiced portions of the speech wave are distinguished by delivering the filtered logarithmic wave from filter 202 to voiced-unvoiced detector 510 in addition to axis-crossing counter 203. Detector 510, which comprises rectifier 511, low pass filter 512, and threshold device 513, determines whether the amplitude level of the filtered logarithmic wave exceeds the preset threshold or bias of element 513 corresponding to the smallest amplitude level associated with voiced sounds. When detector 510 determines that the amplitude level of the filtered logarithmic wave exceeds the present threshold, element 513 delivers an enabling signal to the control terminal of a conventional linear or transmission gate 514, thereby enabling gate 514 to pass to its output terminal the input signal applied to its input terminal from counter 203. On the other hand, when the amplitude level of the filtered logarithmic wave falls below the preset bias of element 513, transmission of an input signal from counter 203 is blocked. Nonzero portions of the signal appearing at the output terminal of gate 514 therefore represent the fundamental period of voiced portions of the incoming speech wave, while the zero portions of the signal at the output terminal of gate 514 indicate the presence of unvoiced portions of the incoming speech wave. The signal appearing at the output terminal of gate 514, which is also referred to as a pitch control signal, therefore describes whether the incoming speech wave at a given instant represents a voiced or an unvoiced sound, and if the speech sound is voiced, the pitch control signal also indicates the fundamental period of the sound.

The output signals of detector 51 and vocoder analyzer 52 are transmitted to a receiver station over a suitable transmission medium, indicated by the broken lines that connect the transmitter and receiver stations in FIG. 5. Since the collective bandwith of the output signals of detector 51 and analyzer 52 is substantially smaller than the bandwidth of the incoming speech wave, the bandwith of the transmission medium may be relatively narrow in comparison with the bandwidth of the speech wave. At the receiver station, the pitch control signal from detector 51 is passed to artificial excitation source 53, while the control signals from analyzer 52 are passed to vocoder synthesizer 54. Artificial excitation source 53 may be a conventional buzz-hiss arrangement which is controlled by the pitch signal to generate either a periodic excitation signal or a random excitation signal, depending upon whether the pitch signal indicates a voiced or an unvoiced sound, and if the sound is voiced, the period of the periodic signal follows the period indicated by the pitch control signal.

The appropriate excitation signal from source 53 is delivered to synthesizer 54, which reconstructs from the excitation signal and the control signals from analyzer 52 an artificial speech wave that is a replica of the original speech wave. The artificial speech wave reconstructed by synthesizer 54 may be converted into audible speech sounds by a suitable reproducer, for example, a conventional loudspeaker 55.

It is to be understood that applications of the principles of this invention are not limited to the specific examples described above, but may include other fields in which it is desired to measure with accuracy a selected frequency of a complex wave. In addition, it is to be understood that the above-described embodiments are merely illustrative of the numerous arrangements which may be devised for the principles of this invention by those skilled in the art without departing from the spirit and scope of the invention.

What is claimed is:

1. A wave analyzer for determining the fundamental carrier frequency of a periodic carrier wave that has been amplitude modulated by a modulating wave which comprises a source of a periodic carrier wave that has been amplitude modulated by a modulating wave so that the spectrum of said amplitude modulated carrier wave represents the convolution of the components of the spectrum of said carrier wave with the components of the spectrum of said modulating wave, means supplied with said amplitude modulated carrier wave for deriving a logarithmic wave proportional to the logarithm of said amplitude modulated carrier wave so that the spectrum of said logarithmic wave represents the sum of the components of the spectrum of the logarithm of said carrier wave and the components of the spectrum of the logarithm of said modulating wave, means supplied with said logarithmic wave for filtering the spectrum of said logarithmic wave to suppress the components from the spectrum of the logarithm of said modulating wave and to pass the components from the spectrum of the logarithm of said carrier wave, and means supplied with the components passed by said filtering means for measuring the fundamental frequency of said components passed by said filtering means.

2. A wave analyzer for determining the frequency of a selected component of the amplitude spectrum of an amplitude modulated wave which comprises a source of a carrier wave that has been amplitude modulated by a modulating wave so that the amplitude spectrum of said amplitude modulated carrier wave represents the convolution of the components of the spectrum of said carrier wave with the components of the spectrum of said modulating wave, means supplied with said amplitude modulated carrier wave for deriving a logarithmic wave proportional to the logarithm of said amplitude modulated carrier wave so that the spectrum of said logarithmic wave represents the sum of the components of the spectrum of the logarithm of said carrier wave and the components of the spectrum of the logarithm of said modulating wave, means supplied with said logarithmic wave for filtering the spectrum of said logarithmic wave to suppress unwanted components of the spectrum of said logarithmic wave and to pass a selected component of the spectrum of said logarithmic wave, and means supplied with said selected component passed by said filtering means for measuring the frequency of said selected component.

3. A wave analyzer for determining the frequency of a selected component of the amplitude spectrum of an amplitude modulated wave which comprises a logarithmic amplifier provided with an input terminal and an output terminal for developing at its output terminal a logarithmic wave proportional to the logarithm of a wave applied to its input terminal, means for applying said amplitude modulated wave to the input terminal of said logarithmic amplifier, filter means provided with an input terminal and an output terminal for passing to its output terminal selected components of the amplitude spectrum of a wave applied to its input terminal, means for connecting the output terminal of said logarithmic amplifier to the input terminal of said filter means, frequency measuring means provided with an input terminal and an output terminal for developing at its output terminal a signal indicative of the frequency of oscillation of a wave applied to its input terminal, and means for connecting the output terminal of said filter means to the input terminal of said frequency means.

4. A speech wave analyzer for determining the period of a speech wave which comprises a source of a speech wave having an amplitude spectrum that represents the product of the components of an excitation spectrum and the components of a vocal tract response spectrum, means supplied with said speech wave for converting the spectrum of said speech wave into a time varying wave that closely resembles a carrier wave amplitude modulated by a modulating wave in which the carrier wave corresponds to said excitation spectrum and the modulating wave corresponds to said vocal tract response spectrum, means in circuit relation with said converting means for obtaining from said time varying wave a logarithmic wave proportional to the logarithm of said time varying wave so that the spectrum of said logarithmic wave represents the sum of the components of the spectrum of the logarithm of said carrier wave and the components of the spectrum of the logarithm of said modulating wave, means supplied with said logarithmic wave for filtering the spectrum of said logarithmic wave to suppress the components from the spectrum of the logarithm of said modulating wave and to pass the components from the spectrum of the logarithm of said carrier wave, and means supplied with the components passed by said filtering means for developing from said components a signal indicative of the fundamental frequency of said components.

5. Apparatus as defined in claim 4 wherein said converting means comprises a plurality of contiguous bandpass filters adapted to pass the individual components of the amplitude spectrum of said speech wave, a plurality of rectifiers and low pass filters in one-to-one correspondence with said bandpass filters for obtaining from said plurality of samples a corresponding plurality of amplitude signals representative of the amplitudes of said components, scanning means for sequentially sampling said plurality of amplitude signals to obtain a time sequence of samples, and a low pass filter for converting said time sequence of samples into a time varying wave.

6. A speech communication system that comprises a transmitter station including a source of a speech wave having an amplitude spectrum that represents the product of the components of an excitation spectrum and the components of a vocal tract response spectrum, an analyzer supplied with said speech wave for deriving a plurality of control signals representative of selected information-bearing characteristics of said speech wave, and a pitch detector supplied with said speech wave for deriving a pitch control signal indicative of both the presence of voiced and unvoiced portions of said speech wave and the fundamental frequency of said voiced portions of said speech wave, said pitch detector comprising means supplied with said speech wave for converting the spectrum of said speech wave into a time varying wave that closely resembles a carrier wave amplitude modulated by a modulating wave in which the carrier wave corresponds to said excitation spectrum and the modulating wave corresponds to said vocal tract response spectrum, means connected to said converting means for obtaining from said time varying wave a logarithmic wave proportional to the logarithm of said time varying wave so that the spectrum of said logarithmic wave represents the sum of the components of the spectrum of the logarithm of said carrier wave and the components of the spectrum of the logarithm of said modulating wave, means supplied with said logarithmic wave for filtering said logarithmic wave to obtain a filtered logarithmic wave by suppressing components from the spectrum of the logarithm of said modulating wave and passing components from the spectrum of the logarithm of said carrier wave, a first subpath connected to said filtering means comprising means for determining whether the amplitude level of said filtered logarithmic wave exceeds a preset threshold corresponding to the smallest amplitude level of said filtered logarithmic wave associated with voiced portions of said speech wave, a second subpath comprising means for developing from the components passed by said filtering means an axis-crossing signal indicative of the axis crossings of said components, and gating means under the control of said first subpath and supplied with said axis-crossing signal developed in said second subpath for deriving from said axis-crossing signal a pitch control signal by transmitting said axis-crossing signal whenever the amplitude level of said filtered logarithmic wave exceeds said preset threshold to indicate the presence of voiced portions of said speech wave and by blocking said axis-crossing signal whenever the amplitude of said filtered logarithmic wave falls below said preset threshold to indicate the presence of unvoiced portions of said speech wave, narrow bandwidth transmission means for delivering to a receiver station said plurality of control signals derived by said analyzer and said pitch control signal derived by said pitch detector, and at said receiver station, means responsive to said pitch control signal for generating an artificial excitation signal, and means supplied with said artificial excitation and said plurality of control signals for synthesizing a replica of said speech wave.

7. Apparatus for separating the envelope characteristic from the fine structure characteristic of the spectrum of a speech wave produced by the response of a human talker's vocal tract to an excitation, wherein said envelope characteristic represents said vocal tract response and said fine structure represents said excitation, which comprises means for converting said speech spectrum into a time-varying wave, wherein said time-varying wave is characterized by a spectrum representing the convolution of a first set of frequency components indicative of said envelope of said speech spectrum with a second set of frequency components indicative of said fine structure of said speech spectrum, means supplied with said time-varying wave for deriving a logarithmic wave proportional to the logarithm of said time-varying wave, wherein the spectrum of said logarithm wave represents the sum of the logarithms of said first set of frequency components and said second set of frequency components, and means supplied with said logarithmic wave for filtering the spectrum of said logarithmic wave to suppress said second set of frequency components in said logarithmic wave spectrum and to pass said first set of frequency components in said logarithmic wave spectrum, wherein said first set of frequency components passed by said filtering means defines a signal representative of the envelope of said speech spectrum.

8. Apparatus for separating the fine structure characteristic of a speech spectrum from the envelope characteristic of said speech spectrum, wherein said speech spectrum is the product of the sepctrum of a human talker's vocal tract and the spectrum of an excitation applied to said vocal tract, and said fine structure characteristic corresponds to said excitation spectrum and said envelope characteristic corresponds to said vocal tract spectrum, which comprises means for converting said speech spectrum wave into a time-varying wave, wherein said time-varying wave is characterized by a spectrum representing the convolution of a first set of frequency components indicative of said envelope of said speech spectrum with a second set of frequency components indicative of said fine structure of said speech spectrum, means supplied with said time-varying wave for deriving a logarithmic wave proportional to the logarithm of said time-varying wave, wherein the spectrum of said logarithmic wave represents the sum of the logarithms of said first set of frequency components and said second set of frequency components, and means supplied with said logarithmic wave for filtering the spectrum of said logarithmic wave to suppress said first set of frequency components in said logarithmic wave spectrum and to pass said second set of frequency components in said logarithmic wave spectrum, wherein said second set of frequency components passed by said filtering means defines a signal representative of the fine structure of said speech spectrum.

9. Apparatus for locating the formants of a speech spectrum characterized by a product of an envelope characteristic and a fine structure characteristic, wherein said envelope characteristic represents the contribution of the spectrum of a talker's vocal tract and said fine structure characteristic represents the contribution of the spectrum of an excitation applied to said vocal tract, which comprises means for converting said speech spectrum into a time-varying wave, means supplied with said time-varying wave for deriving a logarithmic wave proportional to the logarithm of said time-varying wave so that said logarithmic wave represents the sum of two logarithm signal components, a first logarithm signal component representing said envelope characteristic of said speech spectrum and a second logarithm signal component representing said fine structure characteristic of said speech spectrum, means supplied with said logarithmic wave for filtering the spectrum of said logarithmic wave to suppress said second logarithm signal component of said logarithmic wave and to pass said first logarithm signal component of said logarithmic wave, and means responsive to said first logarithm signal component for determining the frequencies at which maxima occur in said first logarithm signal.

10. Apparatus for determining the fundamental period of a speech wave characterized by a spectrum that is the product of an envelope characteristic and a fine structure characteristic, wherein said envelope characteristic represents the contribution of the spectrum of a talker's vocal tract and said fine structure represents the contribution of the spectrum of an excitation applied to said vocal tract, which comprises means for converting the spectrum of said speech wave into a time-varying wave, means supplied with said time-varying wave for deriving a logarithmic wave proportional to the logarithm of said time-varying wave so that said logarithmic wave represents the sum of two logarithm signal components, a first logarithm signal component representing said envelope characteristic and a second logarithm signal component representing said fine structure characteristic, means supplied with said logarithmic wave for filtering the spectrum of said logarithmic wave to suppress said first logarithm signal component of said logarithmic wave and to pass said second logarithm signal component of said logarithmic wave, and means responsive to said second logarithm signal component for measuring the fundamental frequency of said second logarithm signal component.

11. Apparatus for separating the envelope and fine structure characteristics of a speech spectrum produced by the response of a human talker's vocal tract to an excitation, wherein said envelope is representative of the contribution of said vocal tract to said speech spectrum and said fine structure is representative of the contribution of said excitation to said speech spectrum, which comprises means for converting said speech spectrum into a time-varying wave, wherein said time-varying wave represents the product of said envelope and fine structure characteristics of said speech spectrum, means supplied with said time-varying wave for deriving a logarithmic wave proportional to the logarithm of said time-varying wave so that said logarithmic wave represents the sum of two logarithm signal components, a first logarithm signal component representing said envelope characteristic of said speech spectrum and a second logarithm signal component representing said fine structure characteristic of said speech spectrum, and filter means responsive to said logarithmic wave for passing a selected one of said two logarithm signal components of said logarithmic wave and suppressing the other one of said two logarithm signal components of said logarithmic wave.

References Cited by the Examiner

UNITED STATES PATENTS 2,928,902 3/1960 Vilbig ---------------- 179—1

References Cited by the Applicant

UNITED STATES PATENTS 2,908,761 10/1959 Raisbeck.

OTHER REFERENCES

Proceedings of Symposium on Time Series Analysis, June 1962, "The Quefrency Alanysis of Time Series for Echoes: Cepstrum Pseudo-Autocovariance, Cross-Cepstrum and Saphe-Cracking," by Bogert, Healy, Tukey.

KATHLEEN H. CLAFFY, *Primary Examiner.*

R. MURRAY, *Assistant Examiner.*